(12) United States Patent
Yamashita

(10) Patent No.: US 12,415,178 B2
(45) Date of Patent: Sep. 16, 2025

(54) AMMONIA OXIDATION CATALYST DEVICE

(71) Applicant: CATALER CORPORATION, Kakegawa (JP)

(72) Inventor: Yoshinori Yamashita, Kakegawa (JP)

(73) Assignee: CATALER CORPORATION, Kakegawa (JP)

( * ) Notice: Subject to any disclaimer, the term of this patent is extended or adjusted under 35 U.S.C. 154(b) by 858 days.

(21) Appl. No.: 17/606,238

(22) PCT Filed: Apr. 30, 2020

(86) PCT No.: PCT/JP2020/018321
§ 371 (c)(1),
(2) Date: Oct. 25, 2021

(87) PCT Pub. No.: WO2020/226127
PCT Pub. Date: Nov. 12, 2020

(65) Prior Publication Data
US 2022/0203345 A1   Jun. 30, 2022

(30) Foreign Application Priority Data
May 7, 2019   (JP) .................... 2019-087584

(51) Int. Cl.
*B01D 53/94* (2006.01)
*B01J 21/04* (2006.01)
(Continued)

(52) U.S. Cl.
CPC .......... *B01J 29/78* (2013.01); *B01D 53/9418* (2013.01); *B01D 53/9436* (2013.01);
(Continued)

(58) Field of Classification Search
CPC ........ B01J 29/78; B01J 29/7007; B01J 21/04; B01J 23/42; B01J 23/8472; B01J 35/19;
(Continued)

(56) References Cited

U.S. PATENT DOCUMENTS

| | | | |
|---|---|---|---|
| 4,564,604 | A | 1/1986 | Iida et al. |
| 6,479,026 | B1 | 11/2002 | Iida et al. |

(Continued)

FOREIGN PATENT DOCUMENTS

| | | |
|---|---|---|
| CN | 104582845 A | 4/2015 |
| CN | 109351358 A | 2/2019 |

(Continued)

OTHER PUBLICATIONS

Dec. 23, 2022 Search Report issued in European Patent Application No. 20801921.6.
(Continued)

*Primary Examiner* — Dapinder Singh
(74) *Attorney, Agent, or Firm* — Oliff PLC (57) ABSTRACT

An ammonia oxidation catalyst device, including a substrate, a first catalyst coat layer and a second catalyst coat layer, wherein: the first catalyst coat layer includes inorganic oxide particles and a catalytic noble metal supported on the inorganic oxide particles; the second catalyst coat layer includes an $NO_x$ selective reduction catalyst and a proton zeolite H-Zeolite; the first catalyst coat layer is present on the substrate; and the second catalyst coat layer is present on the first catalyst coat layer.

11 Claims, 3 Drawing Sheets

(51) Int. Cl.
B01J 23/42      (2006.01)
B01J 29/78      (2006.01)
B01J 35/00      (2006.01)
B01J 35/56      (2024.01)
F01N 3/20       (2006.01)
F01N 3/28       (2006.01)

(52) U.S. Cl.
CPC ..... B01D 53/9468 (2013.01); B01D 53/9472 (2013.01); B01D 53/9477 (2013.01); B01J 21/04 (2013.01); B01J 23/42 (2013.01); B01J 35/19 (2024.01); B01J 35/56 (2024.01); B01D 2255/1021 (2013.01); B01D 2255/2065 (2013.01); B01D 2255/20707 (2013.01); B01D 2255/20723 (2013.01); B01D 2255/20738 (2013.01); B01D 2255/20776 (2013.01); B01D 2255/2092 (2013.01); B01D 2255/30 (2013.01); B01D 2255/40 (2013.01); B01D 2255/50 (2013.01); B01D 2255/9022 (2013.01); B01D 2255/9032 (2013.01); F01N 3/2066 (2013.01); F01N 3/2803 (2013.01); F01N 3/2842 (2013.01); F01N 2370/04 (2013.01); F01N 2610/02 (2013.01)

(58) Field of Classification Search
CPC .... B01J 35/56; B01J 37/0009; B01J 37/0201; B01J 37/0215; B01J 37/0244; B01J 37/0248; B01J 37/088; B01J 2229/20; B01J 2229/42; B01D 53/9418; B01D 53/9436; B01D 53/9468; B01D 53/9472; B01D 53/9477; B01D 2255/1021; B01D 2255/2065; B01D 2255/20707; B01D 2255/20723; B01D 2255/20738; B01D 2255/20776; B01D 2255/2092; B01D 2255/30; B01D 2255/40; B01D 2255/50; B01D 2255/9022; B01D 2255/9032; B01D 2255/20761; B01D 2255/502; B01D 2251/2062; B01D 2258/012; F01N 3/021; F01N 3/2066; F01N 3/2803; F01N 3/2842; F01N 3/103; F01N 3/106; F01N 2370/02; F01N 2370/04; F01N 2610/02; F01N 13/009; F01N 2510/063; F01N 2510/068

See application file for complete search history.

(56) References Cited

U.S. PATENT DOCUMENTS

| | | | |
|---|---|---|---|
| 10,322,403 B2* | 6/2019 | Maunula | B01J 29/48 |
| 10,773,252 B2* | 9/2020 | Alcove Clave | B01D 53/9418 |
| 10,799,853 B2* | 10/2020 | Chen | B01J 29/70 |
| 2009/0087367 A1 | 4/2009 | Liu et al. | |
| 2013/0142714 A1* | 6/2013 | Sung | B01J 35/19 60/299 |
| 2014/0044635 A1 | 2/2014 | Ito et al. | |
| 2014/0155256 A1 | 6/2014 | Becker et al. | |
| 2015/0224486 A1* | 8/2015 | Bauer | B01J 29/7007 502/74 |

FOREIGN PATENT DOCUMENTS

| | | |
|---|---|---|
| EP | 0841981 B1 | 4/2003 |
| EP | 3088082 A1 | 11/2016 |
| JP | S60-106535 A | 6/1985 |
| JP | H05-049931 A | 3/1993 |
| JP | H06-327943 A | 11/1994 |
| JP | H07-16462 A | 1/1995 |
| JP | H07-289897 A | 11/1995 |
| JP | 2000-093749 A | 4/2000 |
| JP | 2006-326437 A | 12/2006 |
| JP | 2010-519039 A | 6/2010 |
| JP | 2010-540230 A | 12/2010 |
| JP | 2014-512956 A | 5/2014 |
| JP | 2016-504183 A | 2/2016 |
| JP | 2016-41428 A | 3/2016 |
| JP | 2016-511684 A | 4/2016 |
| JP | 2016-73971 A | 5/2016 |
| JP | 2017-525554 A | 9/2017 |
| JP | 2018-527161 A | 9/2018 |
| WO | 2008/106523 A2 | 9/2008 |
| WO | 2010/062730 A2 | 6/2010 |
| WO | 2014/083431 A2 | 6/2014 |
| WO | 2014/120645 A1 | 8/2014 |
| WO | 2016/024126 A1 | 2/2016 |
| WO | 2016/203254 A1 | 12/2016 |
| WO | 2017/180114 A1 | 10/2017 |
| WO | 2019/211277 A1 | 11/2019 |

OTHER PUBLICATIONS

Seong Moon Jung et al.; "The study of a synergetic effect over a H-ZSM-5/V2O5 hybrid catalyst on SCR reaction"; Journal of Molecular Catalysis A: Chemical; Jul. 2005; vol. 236; pp. 94-98.

Siva Sankar Reddy Putluru et al.; "Vanadia supported on zeolites for SCR of NO by ammonia"; Applied Catalysis B: Environmental; Jun. 2010; vol. 97; pp. 333-339.

Jul. 21, 2020 International Search Report issued in International Patent Application No. PCT/JP2020/018321.

Jul. 21, 2020 Written Opinion issued in International Patent Application No. PCT/JP2020/018321.

Nov. 2, 2021 International Preliminary Report on Patentability issued in International Patent Application No. PCT/JP2020/018321.

* cited by examiner

AMMONIA OXIDATION CATALYST DEVICE

FIELD

The present invention relates to an ammonia oxidation catalyst device.

BACKGROUND

As a technology for purifying $NO_x$ contained in exhaust gas from diesel engines and lean burn engines at a high level, selective catalytic reduction (SCR) is known. SCR is a technology in which $NO_x$ purification is carried out by supplying ammonia or an ammonia precursor such as urea to exhaust gas to catalytically react $NO_x$ (conventionally, $NO+NO_2$) with ammonia ($NH_3$) to convert it into nitrogen ($N_2$) and water ($H_2O$).

Exhaust gas purification catalyst devices using such SCR have been emphatically studied, and for example, the techniques of Patent Literature 1 to 6 have been proposed.

In SCR devices, ammonia discharged from the device may be present without contributing to the purification of $NO_x$. An ammonia oxidation catalyst device is used to prevent such ammonia from being released into the atmosphere as-is. Ammonia oxidation catalyst devices have a function of oxidizing and removing ammonia discharged from SCR devices.

CITATION LIST

Patent Literature

[PTL 1] Japanese Unexamined PCT Publication (Kohyo) No. 2016-511684
[PTL 2] Japanese Unexamined PCT Publication (Kohyo) No. 2016-504183
[PTL 3] Japanese Unexamined Patent Publication (Kokai) No. 2016-41428
[PTL 4] Japanese Unexamined PCT Publication (Kokai) No. 2016-73971
[PTL 5] Japanese Unexamined PCT Publication (Kohyo) No. 2010-519039
[PTL 6] Japanese Unexamined PCT Publication (Kohyo) No. 2018-527161

SUMMARY

Technical Problem

In ammonia oxidation catalyst devices, an adsorbent material having an appropriate adsorption capacity for ammonia is used so as to achieve a suitable balance of ammonia slip performance and the $NO_x$ purification performance. As used herein, "ammonia slip performance" means the function of oxidizing ammonia to $N_2$ and $H_2O$.

In connection thereto, if the adsorbent material of the ammonia oxidation catalyst device has a low ability to adsorb ammonia, it is considered that the efficiency of $NO_x$ purification by the reaction with ammonia decreases, and the amount of ammonia slip discharged as-is without contributing to the $NO_x$ purification reaction increases. Conversely, if the amount of ammonia adsorbed by the adsorbent material of the ammonia oxidation catalyst device is excessively large, it is considered that the ammonia slip concentration increases because at the time of acceleration after a large amount of ammonia has been stored, the amount of ammonia desorbed at once becomes excessive with respect to the amount of ammonia consumed by the $NO_x$ purification reaction.

In the prior art exemplified in Patent Literature 1 to 6 described above, there are no known ammonia oxidation catalyst devices which achieve an excellent balance between ammonia slip performance and $NO_x$ purification performance.

The present invention has been completed in light of the above circumstances. Thus, an object of the present invention is to provide an ammonia oxidation catalyst device which can achieve an excellent balance between ammonia slip performance and $NO_x$ purification performance.

Solution to Problem

The present invention is as described below.

<<Aspect 1>>> An ammonia oxidation catalyst device, comprising:
  a substrate, a first catalyst coating layer, and a second catalyst coating layer, wherein
  the first catalyst coating layer contains inorganic oxide particles and a catalyst precious metal carried on the inorganic oxide particles,
  the second catalyst coating layer contains a $NO_x$ selective reduction catalyst and a proton zeolite, and
  a positional relationship of the substrate, the first catalyst coating layer, and the second catalyst coating layer satisfies at least one of A and B described below:
A the first catalyst coating layer is present on the substrate, and
  the second catalyst coating layer is present on the first catalyst coating layer; and
B the second catalyst coating layer is present on the substrate on an exhaust gas flow upstream side, and
  the first catalyst coating layer is present on the substrate on an exhaust gas flow downstream side.

<<Aspect 2>>> The ammonia oxidation catalyst device according to Aspect 1, wherein a content of the proton zeolite in the second catalyst coating layer is 250 g/L or less per L capacity of the substrate.

<<Aspect 3>> The ammonia oxidation catalyst device according to Aspect 2, wherein the content of the proton zeolite in the second catalyst coating layer is 10 g/L or more and 150 g/L or less per L capacity of the substrate.

<<Aspect 4>> The ammonia oxidation catalyst device according to any one of Aspects 1 to 3, wherein the $NO_x$ selective reduction catalyst of the second catalyst coating layer contains an oxide of one or two or more elements selected from vanadium and tungsten.

<<Aspect 5>> The ammonia oxidation catalyst device according to Aspect 4, wherein the $NO_x$ selective reduction catalyst contains an iron-vanadium composite oxide.

<<Aspect 6>> The ammonia oxidation catalyst device according to Aspect 4, wherein the $NO_x$ selective reduction catalyst contains a tungsten-cerium-titanium-silicon composite oxide.

<<Aspect 7>> The ammonia oxidation catalyst device according to any one of Aspects 1 to 6, wherein a content of the $NO_x$ selective reduction catalyst of the second catalyst coating layer is 50 g/L or more in terms of metal oxide mass per L of capacity of the substrate.

<<Aspect 8>> The ammonia oxidation catalyst device according to Aspect 7, wherein the content of the $NO_x$ selective reduction catalyst of the second catalyst coating layer is 80 g/L or more and 200 g/L or less in terms of metal oxide mass per L of capacity of the substrate.

<<Aspect 9>> The ammonia oxidation catalyst device according to any one of Aspects 1 to 8, wherein the catalyst precious metal of the first catalyst coating layer is one or two selected from platinum and palladium.

<<Aspect 10>> The ammonia oxidation catalyst device according to any one of Aspects 1 to 9, wherein the inorganic oxide particles of the first catalyst coating layer contain alumina.

<<Aspect 11>> An exhaust gas purification catalyst system, comprising, in order from an exhaust gas flow upstream side, a $NO_x$ selective catalytic reduction (SCR) device, and the ammonia oxidation catalyst device according to any one of Aspects 1 to 10.

<<Aspect 12>> An exhaust gas purification catalyst system, comprising, in order from an exhaust gas flow upstream side, a diesel oxidation catalyst (DOC) device, a diesel particulate filter (DPF) device, a $NO_x$ selective catalytic reduction (SCR) device, and the ammonia oxidation catalyst device according to any one of Aspects 1 to 10.

Advantageous Effects of Invention

The exhaust gas purification catalyst device of the present invention achieves an excellent balance between ammonia slip performance and $NO_x$ purification performance, and thus, the amount of ammonia slip discharged without contributing to the $NO_x$ purification reaction is small and the $NO_x$ purification rate is high.

DESCRIPTION OF EMBODIMENTS

<<Ammonia Oxidation Catalyst Device>>>

The ammonia oxidation catalyst device of the present invention comprises:
a substrate, a first catalyst coating layer, and a second catalyst coating layer, wherein
the first catalyst coating layer contains inorganic oxide particles and a catalyst precious metal carried on the inorganic oxide particles, and
the second catalyst coating layer contains a $NO_x$ selective reduction catalyst and a proton zeolite.

In the ammonia oxidation catalyst device of the present invention, the positional relationship of the substrate, the first catalyst coating layer, and the second catalyst coating layer satisfies at least one of A and B described below:
A the first catalyst coating layer is present on the substrate, and
 the second catalyst coating layer is present on the first catalyst coating layer; and
B the second catalyst coating layer is present on the substrate on an exhaust gas flow upstream side, and
 the first catalyst coating layer is present on the substrate on an exhaust gas flow downstream side.

The ammonia oxidation catalyst device of the present invention, due to the features as described above, exhibits a very high $NO_x$ purification rate with a small amount of ammonia slip discharged without contributing to the $NO_x$ purification reaction. The present inventors infer the reason therefor as follows.

Zeolite is known to have a comparatively large specific surface area and is excellent in ammonia adsorption performance, and can be used as the ammonia adsorbent material in ammonia oxidation catalyst devices. However, in ammonia oxidation catalyst devices containing a zeolite, adsorbed ammonia may be desorbed at once at the time of acceleration after storage of ammonia. Therefore, the amount of ammonia desorbed may exceed the amount which can be consumed by the $NO_x$ purification reaction, whereby the amount of ammonia slip may increase.

A proton zeolite is used in the ammonia oxidation catalyst device of the present invention. Proton zeolites have excellent ammonia adsorption power because the acidity of the ammonia adsorption site is adjusted by the presence of protons at the ion exchange sites. Thus, it is considered that a proton zeolite suppresses the adsorbed ammonia from being desorbed at once even at the time of acceleration after storage of ammonia, and is gradually released within a range that can contribute to the reduction and purification of $NO_x$. In the ammonia oxidation catalyst device of the present invention, it is considered that due to the coexistence of such a proton zeolite along with $NO_x$ selective reduction catalyst in the second catalyst coating layer, both excellent ammonia slip suppression ability and advanced $NO_x$ purification ability are compatible.

The ammonia oxidation catalyst device of the present invention further comprises a first catalyst coating layer containing inorganic oxide particles and a catalyst precious metal carried on the inorganic oxide particles. In a preferable aspect of the present invention, the first catalyst coating layer has the function of oxidizing and purifying ammonia which did not contribute to the purification reaction of $NO_2$ in the second catalyst coating layer, and can further reduce the amount of ammonia slip.

The elements constituting the ammonia oxidation catalyst device of the present invention will be described in order below.

<Substrate>

As the substrate of the ammonia oxidation catalyst device of the present invention, any substrate which is generally used as the substrate in exhaust gas purification catalyst devices can be used. For example, the substrate can be composed of a material such as cordierite, SiC, stainless steel, or inorganic oxide particles, and may be, for example, a straight-type or wall-flow-type monolithic honeycomb substrate.

<First Catalyst Coating Layer>

The first catalyst coating layer contains inorganic oxide particles and a catalyst precious metal carried on the inorganic oxide particles, and may further comprise optional components other than these. The optional components in the first catalyst coating layer may be, for example, alkaline compounds and binders.

(Inorganic Oxide Particles)

The inorganic oxide particles contained in the first catalyst coating layer may be particles of an oxide of one or more elements selected from, for example, aluminum, silicon, titanium, zirconium, and rare earth elements. Specific examples of inorganic oxide particles include alumina particles and ceria-zirconia composite oxide particles.

The inorganic oxide particles of the first catalyst coating layer may contain, for example, alumina.

<Catalyst Precious Metal>

The catalyst precious metal of the first catalyst coating layer may be a platinum group element, and specifically, for example, one or more selected from platinum, palladium, and rhodium.

In the ammonia oxidation catalyst device of the present invention, the second catalyst coating layer, which is described later, contains a $NO_x$ selective reduction catalyst and has a function of reducing and purifying $NO_x$ with ammonia. Thus, it is desired that the first catalyst coating layer have a function of oxidizing and purifying the ammonia that did not contribute to the purification reaction of $NO_2$. From this point of view, the catalyst precious metal of the first catalyst coating layer may be one or two selected from platinum and palladium.

The catalyst precious metal of the first catalyst coating layer is carried on the inorganic oxide particles. The catalyst precious metal may be carried on all of the inorganic oxide particles, or may be carried on only a portion of the inorganic oxide particles.

When the catalyst precious metal of the first catalyst coating layer contains platinum, the carrying amount of the platinum carried on the inorganic oxide particles may be, based on the mass of the inorganic oxide particles, for example, 0.05% by mass or more, 0.07% by mass or more, 0.10% by mass or more, 0.15% by mass or more, or 0.20% by mass or more, and may be, for example, 1.0% by mass or less, 0.8% by mass or less, 0.7% by mass or less, 0.6% by mass or less, or 0.5% by mass or less.

When the catalyst precious metal of the first catalyst coating layer contains platinum, the amount of platinum in the first catalyst coating layer, in terms of metal platinum mass per L capacity of the substrate, may be, for example, 0.01 g/L or more, 0.02 g/L or more, 0.05 g/L or more, 0.07 g/L or more, or 0.08 g/L or more, and may be, for example, 1.0 g/L or less, 0.8 g/L or less, 0.6 g/L or less, 0.4 g/L or less, or 0.2 g/L or less.

When the catalyst precious metal of the first catalyst coating layer contains palladium, the carrying amount of the palladium carried on the inorganic oxide particles may be, for example, 0.70% by mass or more, 0.75% by mass or more, or 0.80% by mass or more, and may be, for example, 4.0% by mass or less, 3.0% by mass or less, 2.0% by mass or less, or 1.0% by mass or less.

When the catalyst precious metal of the first catalyst coating layer contains palladium, the amount of palladium in the first catalyst coating layer, in terms of metal palladium mass per L capacity of the substrate, may be, for example, 0.01 g/L or more, 0.02 g/L or more, 0.05 g/L or more, or 0.10 g/L or more, and may be, for example, 0.50 g/L or less, 0.40 g/L or less, 0.30 g/L or less, or 0.20 g/L or less.

(Alkaline Compound)

The first catalyst coating layer may contain an alkaline compound. The alkaline compound may be, for example, a compound of an alkali metal, alkaline earth metal, or rare earth metal, or a sulfate, nitrate, carbonate, oxoacid (excluding sulfates, nitrates, and carbonates) salt, or oxide thereof.

(Binder)

The first catalyst coating layer may contain a binder. Examples of binders include alumina sol, zirconia sol, silica sol, and titania sol.

(Coating Amount of First Catalyst Coating Layer)

The amount of the first catalyst coating layer, as a mass of the first catalyst coating layer per L capacity of the substrate, may be, for example, 5 g/L or more, 6 g/L or more, 8 g/L or more, 10 g/L or more, 12 g/L or more, or 15 g/L or more, and may be, for example, 50 g/L or less, 45 g/L or less, 40 g/L or less, 35 g/L or less, or 30 g/L or less.

<Second Catalyst Coating Layer>

The second catalyst coating layer contains a $NO_x$ selective reduction catalyst and a proton zeolite, and may further contain optional components other than these. The optional components in the second catalyst coating layer may be, for example, inorganic oxides other than zeolites and binders.

($NO_x$ Selective Reduction Catalyst)

The $NO_x$ selective reduction catalyst of the second catalyst coating layer has a function of catalyzing the reduction and purification of $NO_x$ by the reaction between $NO_x$ in the exhaust gas and ammonia gradually released from the zeolite, which is described later. The $NO_x$ selective reduction catalyst may be, for example, an oxide containing one or more elements selected from vanadium, molybdenum, tungsten, iron, copper, and bismuth. The $NO_x$ selective reduction catalyst may be an oxide containing, in particular, one or more elements selected from vanadium, molybdenum, tungsten, iron, copper, and bismuth, and one or more elements selected from aluminum, zirconium, cerium, silicon, and titanium.

As the $NO_x$ selective reduction catalyst in the second coating layer, an oxide of one or more elements selected from vanadium and tungsten is preferable, and vanadium oxide, iron-vanadium composite oxides, bismuth-vanadium composite oxides, copper-vanadium composite oxides, tungsten oxides, and tungsten-cerium-titanium-silicon composite oxides are particularly preferable.

From the viewpoint of effectively expressing catalytic ability, the content of the $NO_x$ selective reduction catalyst of the second catalyst coating layer may be, in terms of metal oxide mass per L capacity of the substrate, for example, 50 g/L or more, 60 g/L or more, 70 g/L or more, or 80 g/L or more, and may be, for example, 200 g/L or less, 180 g/L or less, 150 g/L or less, 130 g/L or less, or 120 g/L or less. From the viewpoint of reducing the amount of material that does not contribute to the catalytic reaction and maintaining width of the exhaust gas flow path of the substrate, the content of the $NO_x$ selective reduction catalyst, in terms of metal oxide mass per L capacity of the substrate, is preferably 50 g/L or more, and is more preferably 80 g/L or more and 200 g/L or less.

When the $NO_x$ selective reduction catalyst in the second coat layer contains a silicon element, the mass of the silicon element is calculated by converting it into a silicon oxide mass, which is then included in the metal oxide mass of the $NO_x$ selective reduction catalyst.

(Proton Zeolite)

The proton zeolite of the second catalyst coating layer has functions of contributing to the reduction and purification reaction of $NO_x$ and suppressing ammonia slip by adsorbing and storing ammonia and gradually releasing the stored ammonia in accordance with the situation.

In the proton zeolite, the crystal structure of the zeolite is arbitrary. The crystal structure of the proton zeolite which can be used in the present invention, when shown along with the respective structure code (listed in parentheses), may be, for example, A-type (LTA), ferrierite (FER), MCM-22 (MWW), ZSM-5 (MFI), Mordenite (MOR), L-type (LTL), X-type or Y-type (FAU), beta-type (BEA), Chabazite (CHA), and may be CDO-type or GON-type.

In the present description, a proton zeolite having a specific crystal structure is hereinafter referred to by appending "H-" in front of the structural code of the parent zeolite. For example, a beta-type proton zeolite is written as "H-BEA."

The preferable proton zeolites in the present invention are H-BEA, H-CHA, H-MFI, and H-MOR.

In order to develop appropriate ammonia desorption ability, the content of the proton zeolite in the second catalyst coating layer, as a mass per L capacity of the substrate, may be 10 g/L or more, 15 g/L or more, 20 g/L or more, 25 g/L or more, 30 g/L or more, 40 g/L or more, or 50 g/L or more.

Conversely, if the content of the proton zeolite is excessively high, the ammonia adsorption capacity becomes excessively large, and the amount of ammonia released for $NO_x$ reduction and purification may be insufficient, or the amount of ammonia desorbed at once may increase excessively at the time of acceleration after storage of ammonia. From the viewpoint of preventing this, the content of the proton zeolite, as a mass per L capacity of the substrate, may be, for example, 220 g/L or less, 200 g/L or less, 180 g/L or less, 160 g/L or less, 150 g/L or less, 140 g/L or less, 120 g/L or less, or 100 g/L or less.

The content of the proton zeolite in the second catalyst coating layer may typically be 10 g/L or more and 150 g/L or less per L capacity of the substrate.

In order to maintain the ammonia adsorption amount within an appropriate range and enable slow release of adsorbed ammonia at an appropriate rate within the range required for $NO_x$ reduction purification, it is desirable that the amount of the proton zeolite in the second catalyst coating layer be an appropriate ratio relative to the amount of the $NO_x$ selective reduction catalyst described above. From this point of view, the mass of the proton zeolite in the second catalyst coating layer relative to the mass in terms of metal oxide mass of the $NO_x$ selective reduction catalyst may be, for example, 0.10-fold or more, 0.12-fold or more, 0.15-fold or more, or 0.18-fold or more, and may be, for example, 3.0-fold or less, 1.0-fold or less, 0.80-fold or less, 0.50-fold or less, or 0.30-fold or less.

(Inorganic Oxide Other than Proton Zeolite)

The second catalyst coating layer may further contain an inorganic oxide other than the proton zeolite. The inorganic oxide particles contained in the second catalyst coating layer may be particles of an oxide of one or more elements selected from, for example, aluminum, silicon, titanium, zirconium, and rare earth elements. Specific examples of inorganic oxide particles include alumina particles and ceria-zirconia composite oxide particles.

(Binder)

The second catalyst coating layer may further contain a binder. Examples of binders include alumina sol, zirconia sol, silica sol, and titania sol.

(Coating Amount of Second Catalyst Coating Layer)

The amount of the second catalyst coating layer, as a mass of the second catalyst coating layer per L capacity of the substrate, may be, for example, 50 g/L or more, 70 g/L or more, 80 g/L or more, or 100 g/L or more, and may be, for example, 300 g/L or less, 250 g/L or less, 200 g/L or less, 180 g/L or less, 150 g/L or less, or 120 g/L or less.

<Positional Relationship Between Substrate, First Catalyst Coating Layer, and Second Catalyst Coating Layer>

In the ammonia oxidation catalyst device of the present invention, the positional relationship between the substrate, the first catalyst coating layer, and the second catalyst coating layer satisfies at least one of A and B described below:

A the first catalyst coating layer is present on the substrate, and
the second catalyst coating layer is present on the first catalyst coating layer (structure A); and B the second catalyst coating layer is present on the substrate on an exhaust gas flow upstream side, and
the first catalyst coating layer is present on the substrate on an exhaust gas flow downstream side (structure B).

As described above, the ammonia oxidation catalyst device of the present invention comprises a second catalyst coating layer containing a proton zeolite. The proton zeolite exhibits an excellent ammonia adsorption function and a function of slowly releasing the adsorbed ammonia, and in combination with these functions, exhibits an appropriate ammonia adsorption/desorption property. The ammonia oxidation catalyst device of the present invention has both excellent ammonia slip suppression ability and high $NO_x$ purification ability due to such second catalyst coating layer containing a proton zeolite. Further, in a preferred embodiment of the present invention, the first catalyst coating layer has a function of oxidizing and purifying ammonia that did not contribute to the purification reaction of $NO_2$ in the second catalyst coating layer, whereby the amount of ammonia slip is further reduced.

Thus, the function expected of the present invention can be maximized by initially contacting the exhaust gas flowing into the ammonia oxidation catalyst device of the present invention with the second catalyst coating layer, and after contact with the second catalyst coating layer, contacting it with the first catalyst coating layer.

From such a point of view, in the catalyst coating layers of the ammonia oxidation catalyst device of the present invention:

in the case of a two-layer structure, the second catalyst coating layer is arranged as an upper layer, and the first catalyst coating layer is arranged as a lower layer, as in "structure A" described above, and in the case of a tandem-type structure, the second catalyst coating layer is arranged on the upstream side of the exhaust gas flow and the first catalyst coating layer is arranged on the downstream side of the exhaust gas flow, as in "structure B" described above.

In the ammonia oxidation catalyst device in which the layer structure of the first catalyst coating layer and the second catalyst coating layer is structure B described above, the ratio of the lengths of the first catalyst coating layer and the second catalyst coating layer is arbitrary. The ratio representing each side of the second catalyst coating layer relative to the total length of the first catalyst coating layer and the second catalyst coating layer may be, for example, 30% or more, 40% or more, 50% or more, 60% or more, or 70% or more, and may be 60% or less, 50% or less, 40% or less, or 30% or less.

In the ammonia oxidation catalyst device of the present invention, the positional relationship between the substrate, the first catalyst coating layer and the second catalyst coating layer may satisfy both of structure A and structure B. When the positional relationship between the substrate, the first catalyst coating layer, and the second catalyst coating layer satisfies both structure A and structure B, for example, in the upstream side of the exhaust gas flow, the second catalyst coating layer is present on the substrate, and on the downstream side of the exhaust gas flow, the first catalyst coating layer and the second catalyst coating layer are laminated in this order on the substrate.

The structure of the ammonia oxidation catalyst device of the present invention will be described below with reference to the drawings.

Figure 1:
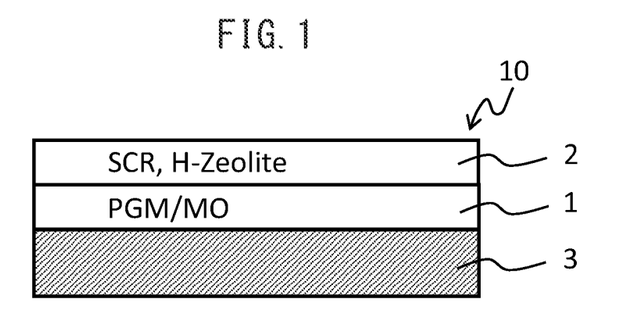
FIG. 1 is a schematic cross-sectional view showing an example of the structure of an ammonia oxidation catalyst device according to the present invention.

The ammonia oxidation catalyst device (10) of FIG. 1 comprises a substrate (3), a first catalyst coating layer (1), and a second catalyst coating layer (2). The first catalyst coating layer (1) contains inorganic oxide particles (MO), and a catalyst precious metal (PGM) on the inorganic oxide particles (MO). The catalyst precious metal (PGM) is carried on the inorganic oxide particles (MO) to form catalyst precious metal-carrying inorganic oxide particles (PGM/MO). The second catalyst coating layer (2) contains a $NO_x$ selective reduction catalyst (SCR) and a proton zeolite (H-Zeolite).

In the ammonia oxidation catalyst device (10), the first catalyst coating layer (1) is present on the substrate (3), and the second catalyst coating layer (2) is present on the first catalyst coating layer (1), forming a two-layer-structure catalyst coating layer.

Figure 2:
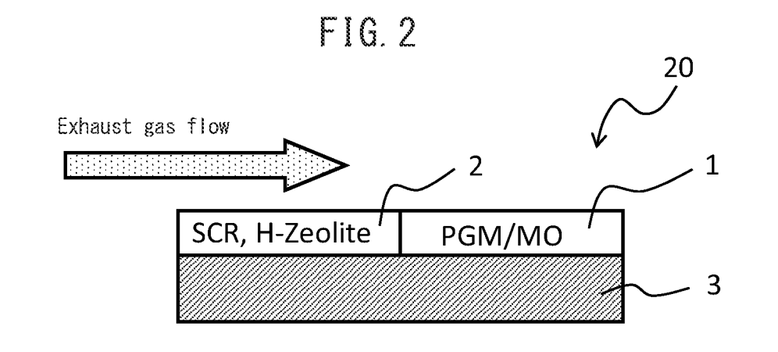
FIG. 2 is a schematic cross-sectional view showing another example of the structure of the ammonia oxidation catalyst device according to the present invention.

The ammonia oxidation catalyst device (20) of FIG. 2 is identical to the ammonia oxidation catalyst device (10) in that:
it comprises a substrate (3), a first catalyst coating layer (1), and a second catalyst coating layer (2),
the first catalyst coating layer (1) contains inorganic oxide particles (MO) and a catalyst precious metal (PGM) on the inorganic oxide particles (MO), to form catalyst precious metal-carrying inorganic oxide particles (PGM/MO), and
the second catalyst coating layer (2) contains a $NO_x$ selective reduction catalyst (SCR) and a proton zeolite (H-Zeolite).

However, the ammonia oxidation catalyst device (20) differs from the ammonia oxidation catalyst device (10) in that:
on the upstream side of the exhaust gas flow, the second catalyst coating layer (2) is present on the substrate (3), and
on the downstream side of the exhaust gas flow, the first catalyst coating layer (1) is present on the substrate (3).

The first catalyst coating layer (1) and the second catalyst coating layer (2) of the ammonia oxidation catalyst device (20) are present on a single substrate (3), and constitute a front-side coating layer and a rear-side coating layer.

Figure 3:
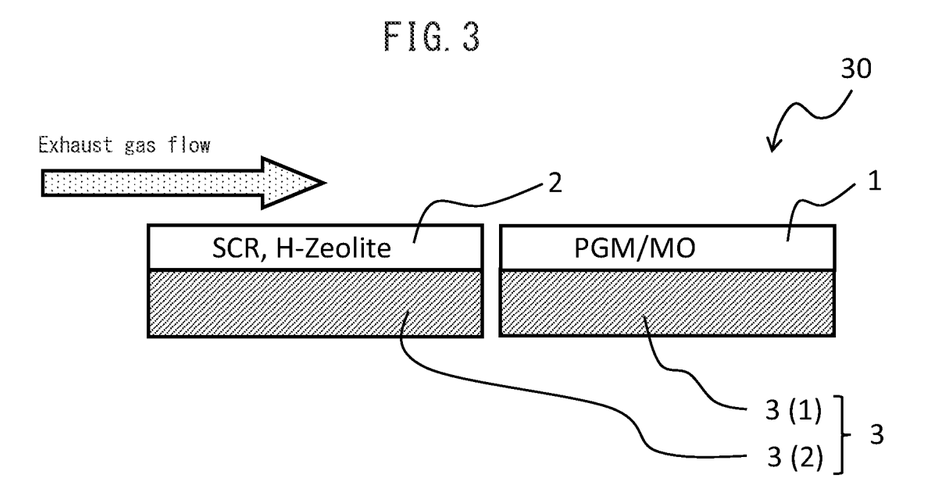
FIG. 3 is a schematic cross-sectional view showing yet another example of the structure of the ammonia oxidation catalyst device according to the present invention.

The ammonia oxidation catalyst device (30) of FIG. 3 is identical to the ammonia oxidation catalyst device (20) in that:
it comprises a substrate (3), a first catalyst coating layer (1), and a second catalyst coating layer (2),
the first catalyst coating layer (1) contains inorganic oxide particles (MO) and a catalyst precious metal (PGM) on the inorganic oxide particles (MO), to form catalyst precious metal-carrying inorganic oxide particles (PGM/MO),
the second catalyst coating layer (2) contains a $NO_x$ selective reduction catalyst (SCR) and a proton zeolite (H-Zeolite),
on the upstream side of the exhaust gas flow, the second catalyst coating layer (2) is present on the substrate, and
on the downstream side of the exhaust gas flow, the first catalyst coating layer (1) is present on the substrate.

However, the ammonia oxidation catalyst device (30) differs from the ammonia oxidation catalyst device (20) in that:
the substrate (3) is divided into a substrate front part (3 (1)) on the upstream side of the exhaust gas flow and a substrate rear part (3 (2)) on the downstream side of the exhaust gas flow,
the second catalyst coating layer (2) is present on the substrate front part (3 (1)), and
the first catalyst coating layer (1) is present on the substrate rear part (3 (2)).

<<Method for Production of Ammonia Oxidation Catalyst Device>>>

The ammonia oxidation catalyst device of the present invention may be produced by any method.

An ammonia oxidation catalyst device in which the layer structure of the first catalyst coating layer and the second catalyst coating layer is the structure A described above may be produced by a method (method A) comprising:
sequentially forming the first catalyst coating layer and the second catalyst coating layer on the substrate.

An ammonia oxidation catalyst device in which the layer structure of the first catalyst coating layer and the second catalyst coating layer is the structure B described above may be produced by a method (method B-1) comprising:
forming the first catalyst coating layer on the substrate to obtain a substrate having a first catalyst coating layer,
forming the second catalyst coating layer on a substrate different from the substrate described above to obtain a substrate having a second catalyst coating layer, and
arranging the substrate having the second catalyst coating layer described above on the upstream side of the exhaust gas flow, arranging the substrate having the first catalyst coating layer described above on the downstream side, and connecting both substrates in series; or
a method (B-2) comprising:
preparing a divided substrate composed of a substrate front stage and a substrate rear stage,
forming the first catalyst coating layer on the substrate rear stage to obtain a substrate rear stage having the first catalyst coating layer,
forming the second catalyst coating layer on the substrate front stage to obtain a substrate front stage having the second catalyst coating layer, and
arranging the substrate front stage having the second catalyst coating layer described above on the upstream side of the exhaust gas flow, arranging the substrate rear stage having the first catalyst coating layer described above on the downstream side, and connecting both substrates in series.

<Substrate>

As the substrate, a desired substrate that the ammonia oxidation catalyst device of the present invention should have may be selected and used. For example, the substrate may be a straight type or wall flow type monolithic honeycomb substrate composed of a material such as cordierite, SiC, stainless steel, or inorganic oxide particles, as described above.

<Formation of Catalyst Coating Layer>
(Method A)

Method A for producing the ammonia oxidation catalyst device of the present invention is a method comprising:
sequentially forming the first catalyst coating layer and the second catalyst coating layer on the substrate.

In method A, the first catalyst coating layer may be formed on the substrate by, for example, applying a first catalyst coating layer formation coating liquid onto the substrate followed by drying and firing.

The first catalyst coating layer formation coating liquid may be a liquid in which the desired components to be contained in the first catalyst coating layer are dissolved or dispersed in a suitable solvent (for example, water). The catalyst precious metal of the first catalyst coating layer is preferably contained in the coating liquid as catalyst precious metal-carrying inorganic oxide particles, which are carried on the inorganic oxide particles in advance.

The catalyst precious metal-carrying inorganic oxide particles can be obtained by, for example, introducing the catalyst precious metal precursor and inorganic oxide particles into a suitable solvent (for example, water), followed by drying and firing. The catalyst precious metal precursor may be, for example, a nitrate, sulfate, or chloride of a desired catalyst precious metal.

The application of the coating liquid and the drying and firing after application may be carried out according to known methods.

In method A, a first catalyst coating layer is formed on a substrate, and the second catalyst coating layer is then formed thereon.

The second catalyst coating layer may be formed, for example, by applying a second catalyst coating layer formation coating liquid on the substrate on which the first catalyst coating layer is formed, followed by drying and firing.

The second catalyst coating layer formation coating liquid may be a liquid in which the desired components contained in the second catalyst coating layer are dissolved or dispersed in a suitable solvent (for example, water).

The application of the coating liquid and the drying and firing after application may be carried out according to known methods.

(Method B-1)

Method B-1 for the production of the ammonia oxidation catalyst device of the present invention is a method comprising:
preparing a divided substrate which is composed of a substrate front part and a substrate rear part,
forming the first catalyst coating layer on the substrate rear part to obtain a substrate rear part having the first catalyst coating layer,
forming the second catalyst coating layer on the substrate front part to obtain a substrate front part having the second catalyst coating layer, and
arranging the substrate front part having the second catalyst coating layer described above on the upstream side of the exhaust gas flow, arranging the substrate rear part having the first catalyst coating layer described above on the downstream side, and connecting both substrates in series.

In method B-1, first, a divided substrate which is composed of a substrate front part and a substrate rear part is prepared. This may be accomplished by a method of dividing one substrate into two at a desired division ratio, or may be accomplished by preparing two separate substrates, one of which is used as the front part and the other of which is used as the rear part.

The step of forming the first catalyst coating layer on the substrate rear part to obtain a substrate rear part having the first catalyst coating layer may be carried out in the same manner as the formation of the first catalyst coating layer in method A. The step of forming the second catalyst coating layer on the substrate front part to obtain a substrate front part having a second catalyst coating layer may be carried out in the same manner as the formation of the second catalyst coating layer in method A except that a separate substrate is used in place of the substrate in which the first catalyst coating layer is formed. These steps may be carried out in any order.

In method B-1, next, the substrate having the second catalyst coating layer is arranged on the upstream side of the exhaust gas flow, the substrate having the first catalyst coating layer is arranged on the downstream side, and the substrates are connected in series. This step may be carried out by an appropriate method which can be understood by a person skilled in the art.

(Method B-2)

Method B-2 for producing the ammonia oxidation catalyst device of the present invention is a method comprising;
forming the first catalyst coating layer on the exhaust gas flow downstream side of a substrate, and
forming the second catalyst coating layer on the exhaust gas flow upstream side of the substrate.

In method B-2, the first catalyst coating layer may be formed by, for example, applying the first catalyst coating layer formation coating liquid from the downstream end of the exhaust gas flow of the substrate to a predetermined range followed by drying and firing. The second catalyst coating layer may be formed by, for example, applying the second catalyst coating layer formation coating liquid from the exhaust gas flow upstream side end of the substrate to a predetermined range followed by drying and firing. The formation order of the first catalyst coating layer and the second catalyst coating layer may be arbitrary.

There is another method in which the first catalyst coating layer formation coating liquid is applied from the exhaust gas flow downstream end of the substrate to a predetermined range and then dried, the second catalyst coating layer formation coating liquid is then applied from the exhaust gas flow upstream side end of the substrate to a predetermined range, and then dried, and thereafter, the first catalyst coating layer and the second catalyst coating layer are fired together may be adopted. The application order of the first catalyst coating layer formation coating liquid and the second catalyst coating layer formation coating liquid may be reversed from the above.

The first catalyst coating layer formation coating liquid and the second catalyst coating layer formation coating liquid in method B-2 may be the same as the first catalyst coating layer formation coating liquid and the second catalyst coating layer formation coating liquid in method A, respectively.

The ammonia oxidation catalyst device of the present invention can be produced by the above methods. However, the methods described above are merely examples of methods for producing the ammonia oxidation catalyst device of the present invention, and the ammonia oxidation catalyst device of the present invention may be produced by any method other than the above.

<<Exhaust Gas Purification Catalyst System>>

In another aspect of the present invention, there is provided an exhaust gas purification catalyst system comprising, in order from the exhaust gas flow upstream side, a $NO_x$ selective catalytic reduction (SCR) device and the ammonia oxidation catalyst device of the present invention.

Any known SCR device can be used as the SCR device of the exhaust gas purification catalyst system of the present invention. The SCR device may be an ammonia SCR device in which ammonia is directly supplied to the SCR device, or a urea SCR device in which urea as an ammonia precursor is supplied in place of ammonia. In the present invention, a urea SCR device may be used in particular because it is easy to handle.

The urea SCR device may include, for example, a urea water tank, a urea water injection device, and an SCR catalyst. The SCR catalyst may be, for example, a catalyst containing titania or an oxide of an element selected from vanadium and tungsten.

The exhaust gas purification catalyst system may be an exhaust gas purification catalyst system which further comprises, on the exhaust gas flow upstream side, a diesel oxidation catalyst (DOC) device and a diesel particulate filter (DPF) device, and comprises, in order from the exhaust gas flow upstream side, a diesel oxidation catalyst (DOC) device, a diesel particulate filter (DPF) device, a $NO_x$ selective catalytic reduction (SCR) device, and the ammonia oxidation catalyst device of the present invention.

Any known DOC device can be used as the DOC device of the exhaust gas purification catalyst system of the present invention. For example, the DOC device may be a catalyst device in which a coating layer containing inorganic oxide particles, such as zirconia particles or ceria particles, and a catalyst precious metal carried on the organic oxide particles is formed on a substrate composed of cordierite.

Any known DPF device can be used as the DPF device of the exhaust gas purification catalyst system of the present invention. For example, the DPF device may be a catalyst device in which a coat layer containing inorganic oxide particles, such as alumina particles, and a catalyst precious metal carried on the inorganic oxide particles are formed on a substrate made of cordierite.

Hereinafter, the structure of the exhaust gas purification catalyst system of the present invention will be described with reference to the drawings.

Figure 4:
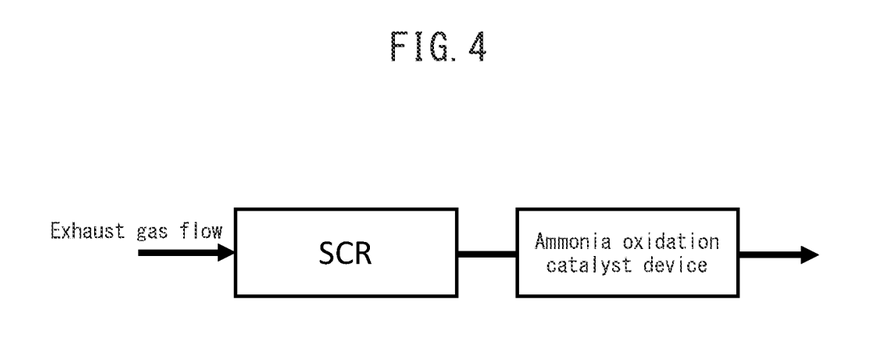
FIG. 4 is a schematic view showing an example of the structure of an exhaust gas purification catalyst system according to the present invention.

The exhaust gas purification catalyst system of FIG. 4 has a $NO_x$ selective catalytic reduction (SCR) device and an ammonia oxidation catalyst device of the present invention in order from the upstream side of the exhaust gas flow.

Figure 5:
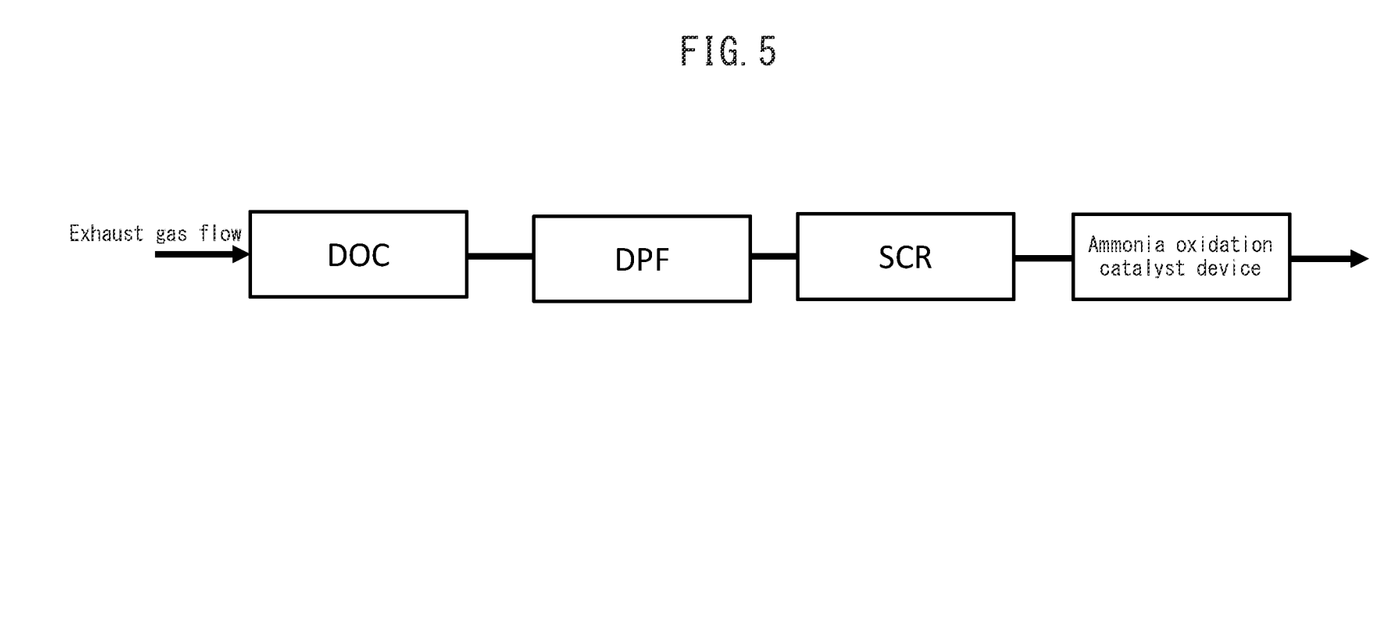
FIG. 5 is a schematic view showing another example of the structure of the exhaust gas purification catalyst system according to the present invention.

The exhaust gas purification catalyst system shown in FIG. 5 comprises, in order from the exhaust gas flow upstream side, a diesel oxidation catalyst (DOC) device, a diesel particulate filter (DPF) device, a $NO_x$ selective catalytic reduction (SCR) device, and the ammonia oxidation catalyst device of the present invention.

EXAMPLES

Example 1

<Preparation of First Catalyst Coating Layer Formation Coating Liquid>

Dinitrodiamine platinum nitrate in an amount of 0.1 g in terms of platinum metal was dissolved in 300 mL of pure water, and 30 g of γ-alumina was then added thereto and mixed to prepare a slurry. The obtained slurry was heated to 120° C. and dried, and then fired at 500° C. to obtain a Pt-carrying powder (powder A) having a Pt-carrying amount of 0.33% by mass based on alumina. The total amount (30.1 g) of the obtained powder A, 3.0 g of alumina sol as a binder, and 100 mL of pure water were mixed to prepare a first catalyst coating layer formation coating liquid.

<Preparation of Second Catalyst Coating Layer Formation Coating Liquid>

A ferrovanadium (FeV) powder in an amount of 100 g in terms of metal oxide mass as the $NO_x$ selective reduction catalyst, 20 g of a BEA-type zeolite (BEA-type proton zeolite, H-BEA) (silica to alumina molar ratio (SAR)=40) as the zeolite in which protons are present at ion exchange sites, 10 g of a binder, and 300 mL of pure water were mixed to prepare a second catalyst coating layer formation coating liquid.

<Production of Ammonia Oxidation Catalyst Device>

The entire amount of the first catalyst coating layer formation coating liquid was applied onto a honeycomb substrate having a capacity of approximately 1 L, which was then heat-treated to form a lower layer. Next, the entire amount of the second catalyst coating layer formation coating liquid was applied onto the obtained lower layer and then heat-treated to form the upper layer, whereby an ammonia oxidation catalyst device having a first catalyst coating layer (lower layer) having a coating amount of 30.1 g/L and a second catalyst coating layer (upper layer) having a coating amount of 130 g/L on the substrate was produced.

<Evaluation of Ammonia Oxidation Catalyst Device>

(1) $NH_3$ Slip Performance Evaluation

The evaluation of the $NH_3$ slip performance was carried out using an exhaust gas purification catalyst system having the following structure. Specifically, a copper zeolite $NO_x$ selective catalytic reduction (SCR) device was arranged on the upstream side of the gas flow, an ammonia oxidation catalyst device was arranged on the downstream side, and the two were connected in series to produce an exhaust gas purification catalyst system, which was used for evaluation. "Copper zeolite" means a zeolite in which copper ions are present at ion exchange sites.

The $NH_3$ slip performance was evaluated by examining the $NH_3$ adsorption/desorption behavior of the exhaust gas purification catalyst system having the above configuration. Specifically, at each stage of a: $NH_3$ purging, b: $NH_3$ adsorption, and c: $NH_3$ desorption, a gas having a predetermined composition is introduced from the upstream side of the exhaust gas purification catalyst system at a predetermined temperature change, and the operation of circulating in the exhaust gas purification catalyst system and discharging from the downstream end was continuously carried out. At this time, in the c: $NH_3$ desorption step, the $NH_3$ concentration in the gas discharged from the downstream end of the exhaust gas purification catalyst system was measured over time, and a graph showing the time course of the $NH_3$ desorption concentration was created. The peak temperature and peak concentration of $NH_3$ elimination in the obtained graph were used as an index of $NH_3$ slip performance of the ammonia oxidation catalyst device contained in the exhaust gas purification catalyst system.

The operating conditions of each stage are as described below.

a: $NH_3$ Purging Stage
   Operation time: Approximately 30 minutes
   Temperature change of introduced gas: the temperature was raised from room temperature at a rate of 30° C./min until it reached 600° C., and after reaching 600° C., the temperature was lowered at a rate of −40° C./min until it reached 150° C.
   Composition of introduced gas: 0 ppm $NH_3$, 10% $O_2$, 5% $H_2O$, and $N_2$ balance b: $NH_3$ Adsorption Stage
   Operation time: until the $NH_3$ adsorption of the exhaust gas purification catalyst system reached saturation
   Temperature change of introduced gas: 150° C. (maintained constant temperature) Composition of introduced gas: 300 ppm $NH_3$, 10% $O_2$, 5% $H_2O$, and $N_2$ balance c: NH$_3$ Desorption Test
  Operation time: 15 minutes or more
  Temperature change of introduced gas: the temperature was rained from 150° C. at a rate of 30° C./min until it reached 600° C., and maintained at that temperature after reaching 600° C.
  Composition of introduced gas: 0 ppm NH$_3$, 10% O$_2$, 5% H$_2$O, and N$_2$ balance The description "until the NH$_3$ adsorption of the exhaust gas purification catalyst system reached saturation" in the operation time in the "b: NH$_3$ Adsorption Stage" means the time until the NH$_3$ concentration in the exhaust gas reached 99% (297 ppm) or more of the NH$_3$ concentration (300 ppm) in the introduced gas.

(2) Evaluation of NO$_x$ purification Performance

The NO$_x$ purification performance was evaluated using the ammonia oxidation catalyst device alone at an evaluation temperature of 200° C.

To evaluate the NO$_x$ purification performance, a model gas containing NO$_x$ and NH$_3$ having known concentrations was introduced into the ammonia oxidation catalyst device and distributed, the NO$_x$ concentration in the exhaust gas was measured, and the NO$_x$ purification rate calculated by the following formula was used as an index of NO$_x$ purification performance.

NO$_x$ purification performance (%)={(NO$_x$ concentration in the introduced gas−NO$_x$ concentration in the exhaust gas)/NO$_x$ concentration in the introduced gas}×100

Specifically, in each stage of a: temperature adjustment and b: NO$_x$ purification performance evaluation, the gas having a predetermined composition and temperature set to 200° C. was introduced into the ammonia oxide catalyst device, and the NO$_x$ concentrations in the introduced gas and the exhaust gas at the b: NO$_x$ purification performance evaluation stage were substituted into the above formula for evaluation.

The operation conditions of each stage are as described below.

a: Temperature Adjustment Stage
  Operation time: until the temperature of the exhaust gas stabilized
  Introduced gas temperature: 200° C.
  Composition of introduced gas: 300 ppm NO, 0 ppm NO$_2$, 0 ppm NH$_3$, 10% O$_2$, 5% H$_2$O, and N$_2$ balance
  Ratio to NO$_x$ ammonia (ANR): 0
  Spatial velocity of introduced gas: 60,000 hr$^{-1}$ B: NO$_x$ purification Performance Evaluation Stage
  Operation time: -
  Introduced gas temperature: 200° C.
  Composition of introduced gas: 300 ppm NO, 0 ppm NO$_2$, 330 ppm NH$_3$, 10% O$_2$, 5% H$_2$O, and N$_2$ balance
  Ratio to NO$_x$ ammonia (ANR): 1.1
  Spatial velocity of introduced gas: 60,000 hr$^{-1}$
  The evaluation results are shown in Table 1.

Examples 2 to 5, 7, and 8 and Comparative Examples 1 to 5

The second catalyst coating layer formation coating liquid was prepared in the same manner as Example 1 ammonia oxidation catalyst devices were prepared and evaluated using these in the same manner as Example 1 except that the types and quantities of the NO$_x$ selective reduction catalysts and zeolites shown in Table 1 were used.

In Comparative Example 1, a zeolite was not used. In Comparative Examples 2 to 4, a NO$_x$ selective reduction catalyst was not used. In Comparative Example 4, along with zeolite, 100 g of γ-alumina was used as another inorganic oxide.

Example 6

<Preparation of Catalyst Coating Layer Formation Coating Liquid>>

The first catalyst coating layer formation coating liquid and the second catalyst coating layer formation coating liquid were each prepared in the same manner as Example 1.

<Production of Ammonia Oxidation Catalyst Device>

The entire amount of the first catalyst coating layer formation coating liquid was applied onto a honeycomb substrate with a capacity of approximately 1 L and heat-treated to prepare a catalyst for the rear part of the ammonia oxidation catalyst device having a first catalyst coating layer having a coating amount of 30.1 g/L on the substrate. The entire amount of the second catalyst coating layer formation coating liquid was applied onto a honeycomb substrate different from the above having a capacity of approximately 1 L and heat-treated to prepare a catalyst for the front part of the ammonia oxidation catalyst device having a second catalyst coating layer having a coating amount of 130 g/L on the substrate.

A tandem type ammonia oxidation catalyst device was produced by connecting the front part catalyst and the rear part catalyst obtained above in series. At this time, the catalyst for the first stage was configured to be arranged on the upstream side of the exhaust gas flow.

<Evaluation of Ammonia Oxidation Catalyst Device>

The various evaluations were carried out in the same manner as in Example 1 except that the ammonia oxidation catalyst device obtained above was used.

The evaluation results are shown in Table 1.

The abbreviations of the types of NO$_x$ selective reduction catalysts in Table 1 have the following meanings, and the amount of each thereof is a mass in terms of metal oxide mass per L of the substrate.

FeV: Iron-vanadium composite oxide obtained from ferrovanadium
  WCeTiSi: Tungsten-cerium-titanium-silicon composite oxide obtained by immersing a TiSi carrier in an aqueous solution containing cerium nitrate and tungstic acid and then firing.

The abbreviations of the types of zeolites in Table 1 have the following meanings.

H-BEA: BEA type proton zeolite
  H-MFI: MFI type proton zeolite
  H-CHA: CHA type proton zeolite
  H-MOR: MOR type proton zeolite
  Fe-BEA: BEA type iron zeolite (BEA type zeolite in which iron ions are present at the ion exchange sites)
  Cu-CHA: CHA-type copper zeolite (BEA-type zeolite in which copper ions are present at the ion exchange sites)

TABLE 1

| | Ammonia Oxidation Catalyst Device Structure | | | | | | |
|---|---|---|---|---|---|---|---|
| | First Catalyst Coating Layer | | Second Catalyst Coating Layer | | | | |
| | Catalyst Precious Metal | | $NO_X$ Selective Reduction Catalyst | | Zeolite | | |
| | Type | Amount Usage Amount per Unit Capacity of Substrate (g/L) | Type | Amount Usage Amount per Unit Capacity of Substrate (g/L) | Type | Amount Usage Amount per Unit Capacity of Substrate (g/L) | Other Inorganic Oxide Type |
| Ex 1 | Pt | 0.1 | FeV | 100 | H-BEA | 20 | — |
| Ex 2 | Pt | 0.1 | FeV | 100 | H-MFI | 20 | — |
| Ex 3 | Pt | 0.1 | FeV | 100 | H-CHA | 20 | — |
| Ex 4 | Pt | 0.1 | FeV | 100 | H-MOR | 20 | — |
| Ex 5 | Pt | 0.1 | WCeTiSi | 100 | H-BEA | 20 | — |
| Ex 6 | Pt | 0.1 | FeV | 100 | H-BEA | 20 | — |
| Ex 7 | Pt | 0.1 | FeV | 100 | H-BEA | 100 | — |
| Ex 8 | Pt | 0.1 | FeV | 100 | H-BEA | 200 | — |
| Comp Ex 1 | Pt | 0.1 | FeV | 100 | — | 0 | — |
| Comp Ex 2 | Pt | 0.1 | — | 0 | Fe-BEA | 140 | — |
| Comp Ex 3 | Pt | 0.1 | — | 0 | Cu-CHA | 140 | — |
| Comp Ex 4 | Pt | 0.1 | — | 0 | H-BEA | 20 | $\gamma$-$Al_2O_3$ |
| Comp Ex 5 | Pt | 0.1 | FeV | 100 | Fe-BEA | 20 | — |

| | Ammonia Oxidation Catalyst Device Structure | | Evaluation Results | | |
|---|---|---|---|---|---|
| | Second Catalyst Coating Layer Other Inorganic Oxide Amount Usage Amount per Unit Capacity of Substrate (g/L) | Layer Structure | $NH_3$ Slip Property | | $NO_X$ Purification Ability |
| | | | Peak Concentration (ppm) | Peak Temp (° C.) | $NO_X$ Purification Rate (%) |
| Ex 1 | 0 | Two-Layer | 370 | 263 | 50 |
| Ex 2 | 0 | Two-Layer | 365 | 269 | 47 |
| Ex 3 | 0 | Two-Layer | 409 | 265 | 60 |
| Ex 4 | 0 | Two-Layer | 387 | 271 | 45 |
| Ex 5 | 0 | Two-Layer | 379 | 264 | 72 |
| Ex 6 | 0 | Tandem | 377 | 267 | 61 |
| Ex 7 | 0 | Two-Layer | 450 | 268 | 53 |
| Ex 8 | 0 | Two-Layer | 560 | 267 | 50 |
| Comp Ex 1 | 0 | Two-Layer | 380 | 270 | 15 |
| Comp Ex 2 | 0 | Two-Layer | 642 | 276 | 50 |
| Comp Ex 3 | 0 | Two-Layer | 845 | 271 | 75 |
| Comp Ex 4 | 100 | Two-Layer | 815 | 270 | 5 |
| Comp Ex 5 | 0 | Two-Layer | 412 | 265 | 23 |

The following can be understood by referring to Table 1.

In the ammonia oxidation catalyst device of Comparative Example 1, the second catalyst coating layer contained a $NO_x$ selective reduction catalyst but did not contain a zeolite. In the exhaust gas catalyst device of Comparative Example 1, though the peak concentration of $NH_3$ slip was relatively low, the $NO_x$ purification rate at 200° C. was insufficient.

Conversely, in the ammonia oxidation catalyst devices of Comparative Examples 2 and 3, the second catalyst coating layer contained a zeolite (BEA-type iron zeolite, Fe-BEA), but did not contain a $NO_x$ selective reduction catalyst. In these ammonia oxidation catalyst devices, the $NO_x$ purification rate at 200° C. was improved as compared with the ammonia oxidation catalyst device of Comparative Example 1, but the peak concentration of $NH_3$ slip was extremely high.

In the ammonia oxidation catalyst device of Comparative Example 4, in the second catalyst coating layer, BEA type proton zeolite (H-BEA) and γ-alumina were used in combination in place of the zeolite (Fe-BEA) of Comparative Example 2. In the ammonia oxidation catalyst device of Comparative Example 4, the peak concentration of $NH_3$ slip was even higher than that of the ammonia oxidation catalyst device of Comparative Example 2, and the $NO_x$ purification rate at 200° C. was extremely low.

The ammonia oxidation catalyst device of Comparative Example 5 was obtained by adding Fe-BEA to the second catalyst coating layer of the ammonia oxidation catalyst device of Comparative Example 1. The ammonia oxidation catalyst device of Comparative Example 5 had a slightly improved $NO_x$ purification rate at 200° C. as compared with the ammonia oxidation catalyst device of Comparative Example 1, but the peak concentration of $NH_3$ slip was higher.

In the ammonia oxidation catalyst devices of Examples 1 to 8, the second catalyst coating layer contained both a $NO_x$ selective reduction catalyst and a proton zeolite. These ammonia oxidation catalyst devices showed a low peak concentration of $NH_3$ slip and a high $NO_x$ purification rate at 200° C.

From the above results, it was verified that the ammonia oxidation catalyst device specified in the present invention has both $NH_3$ slip performance and $NO_x$ purification ability at high levels.

DESCRIPTION OF REFERENCE SIGNS 1 first catalyst coating layer
2 second catalyst coating layer
3 substrate
3(1) substrate front part
3(2) substrate rear part
10, 20, 30 ammonia oxidation catalyst device

The invention claimed is:

1. An ammonia oxidation catalyst device, comprising:
a substrate;
a first catalyst coating layer that contains:
  inorganic oxide particles; and
  a catalyst precious metal carried on the inorganic oxide particles; and
a second catalyst coating layer that contains:
  a $NO_x$ selective reduction catalyst comprising a tungsten-cerium-titanium-silicon composite oxide; and
  a proton zeolite, and
wherein a positional relationship of the substrate, the first catalyst coating layer, and the second catalyst coating layer is either of A and B described below:
A the first catalyst coating layer is present on the substrate, and
  the second catalyst coating layer is present on the first catalyst coating layer; and
B the second catalyst coating layer is present on the substrate on an exhaust gas flow upstream side, and
  the first catalyst coating layer is present on the substrate on an exhaust gas flow downstream side.

2. The ammonia oxidation catalyst device according to claim 1, wherein a content of the proton zeolite in the second catalyst coating layer is 250 g/L or less per L capacity of the substrate.

3. The ammonia oxidation catalyst device according to claim 2, wherein the content of the proton zeolite in the second catalyst coating layer is 10 g/L or more and 150 g/L or less per L capacity of the substrate.

4. The ammonia oxidation catalyst device according to claim 2, wherein a content of the $NO_x$ selective reduction catalyst of the second catalyst coating layer is 50 g/L or more in terms of metal oxide mass per L of capacity of the substrate.

5. The ammonia oxidation catalyst device according to claim 1, wherein a content of the $NO_x$ selective reduction catalyst of the second catalyst coating layer is 50 g/L or more in terms of metal oxide mass per L of capacity of the substrate.

6. The ammonia oxidation catalyst device according to claim 5, wherein the content of the $NO_x$ selective reduction catalyst of the second catalyst coating layer is 80 g/L or more and 200 g/L or less in terms of metal oxide mass per L of capacity of the substrate.

7. The ammonia oxidation catalyst device according to claim 1, wherein the catalyst precious metal of the first catalyst coating layer is one or two selected from platinum and palladium.

8. The ammonia oxidation catalyst device according to claim 1, wherein the inorganic oxide particles of the first catalyst coating layer contain alumina.

9. The ammonia oxidation catalyst device according to claim 1, wherein
a content of the proton zeolite in the second catalyst coating layer is 220 g/L or less per L capacity of the substrate.

10. An exhaust gas purification catalyst system, comprising, in order from an exhaust gas flow upstream side, a $NO_x$ selective catalytic reduction (SCR) device, and the ammonia oxidation catalyst device according to claim 1.

11. An exhaust gas purification catalyst system, comprising, in order from an exhaust gas flow upstream side, a diesel oxidation catalyst (DOC) device, a diesel particulate filter (DPF) device, a $NO_x$ selective catalytic reduction (SCR) device, and the ammonia oxidation catalyst device according to claim 1.

* * * * *